March 4, 1941.  V. H. PAVLECKA  2,233,820
METHOD OF RIVETING
Filed Feb. 23, 1937  2 Sheets-Sheet 2
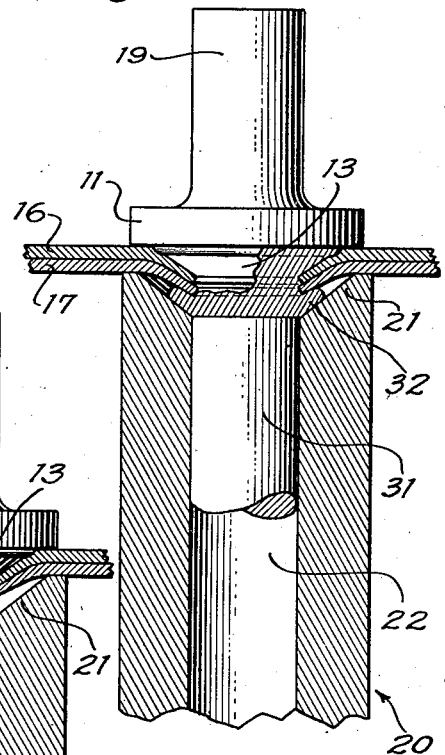
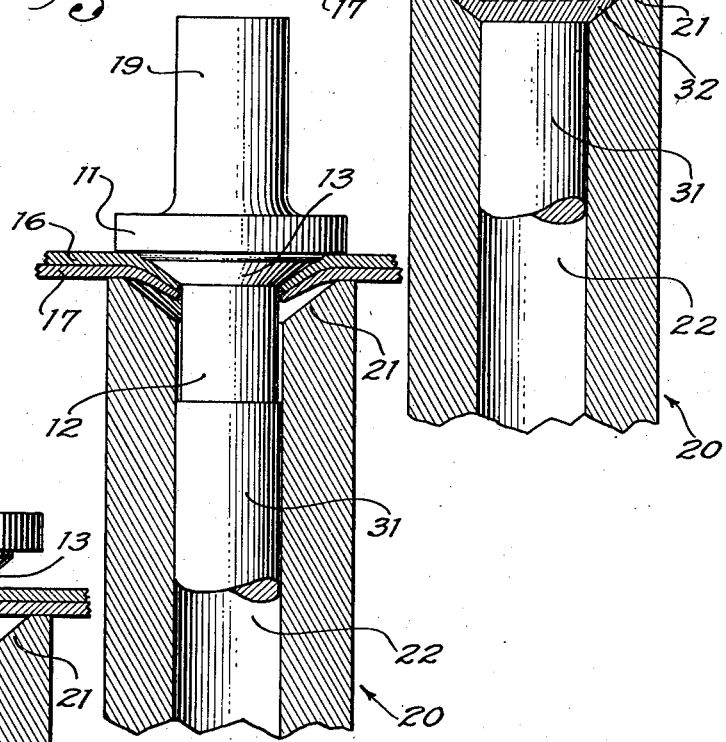
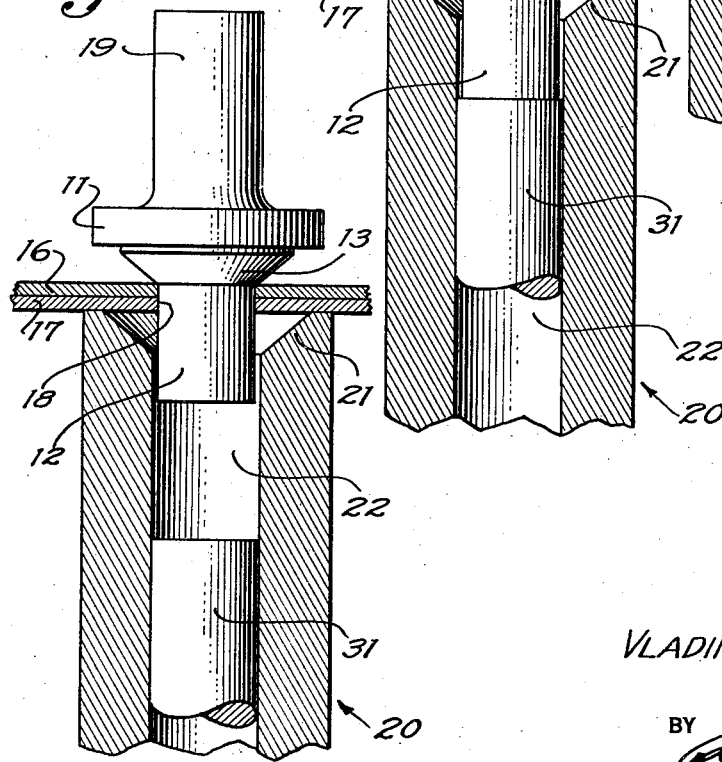
VLADIMIR H. PAVLECKA,
INVENTOR.
BY 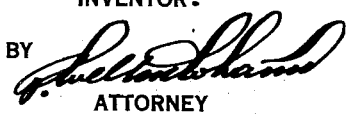
ATTORNEY Patented Mar. 4, 1941

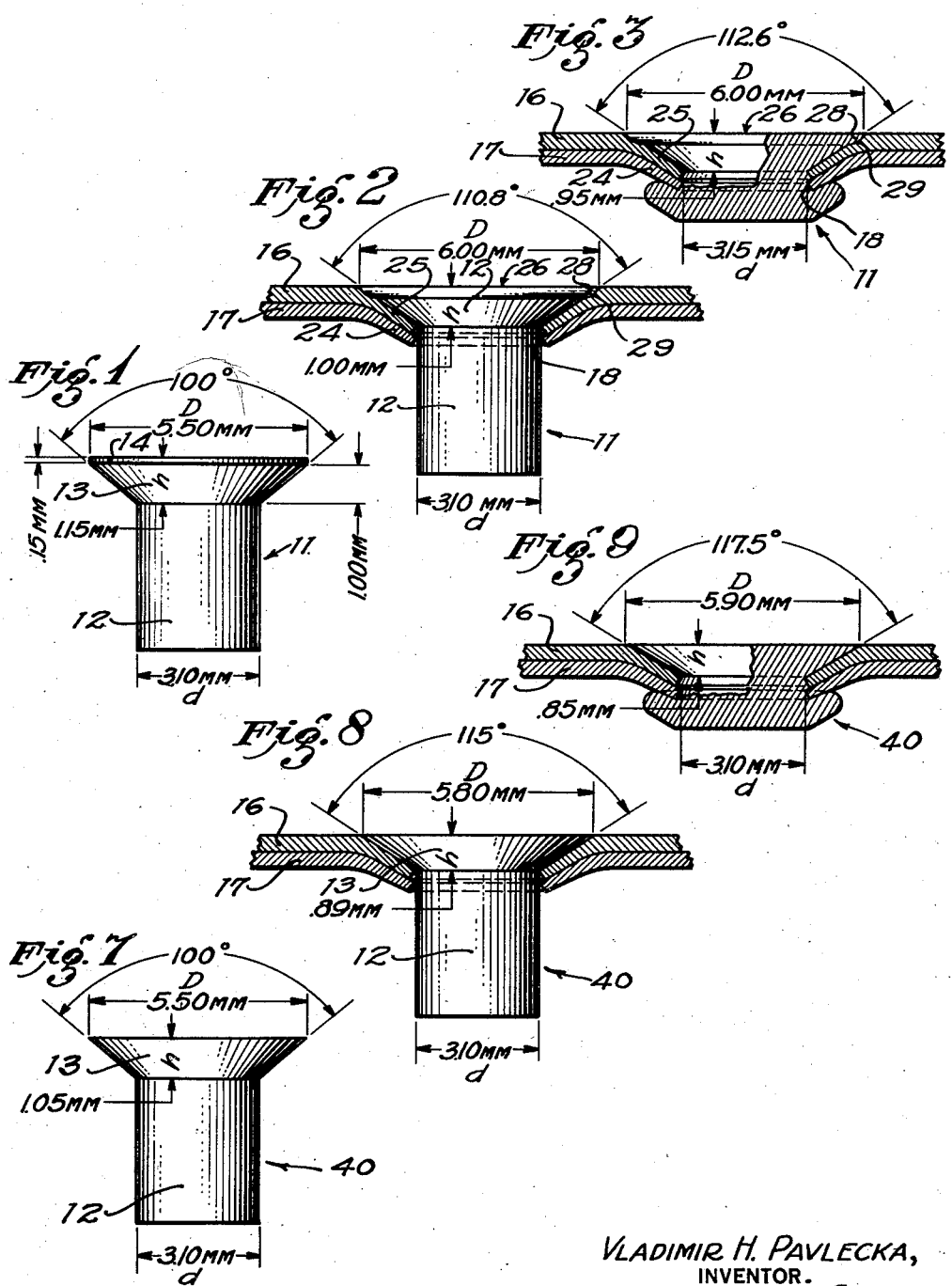

2,233,820

UNITED STATES PATENT OFFICE 2,233,820

METHOD OF RIVETING

Vladimir H. Pavlecka, Santa Monica, Calif., assignor to Douglas Aircraft Company, Inc., Santa Monica, Calif., a corporation of Delaware Application February 23, 1937, Serial No. 126,958

13 Claims. (Cl. 78—46)

My invention relates to the art of riveting and consists of a unique method of riveting to form a riveted joint of my invention, an improved riveted joint, and a unique rivet therefor.

My invention has a particular utility in the aircraft industry where relatively thin gauges of metal are employed and where especial care must be exercised in forming riveted joints which must meet strict requirements. I will therefore describe my invention with particular reference to the requirements of the aircraft industry. It should be understood, however, that my invention is of utility in other industries where riveted joints are used, and I therefore do not wish my invention to be limited to the aircraft industry.

It is the general object of my invention to provide a riveted joint in which the head of the rivet is located in a cavity or dimple formed in the metal which is to be riveted together so that the head is substantially flush with the surface of the metal, and in which the cavity or dimple is formed by driving the rivet into place by impact blow, the sheets of metal to be riveted being flanged in the direction of the force which has been applied to form the dimple, and in which are incorporated numerous features and advantages of considerable value over the prior art. In addition to this it is a part of the general object of my invention to provide a unique method of riveting or forming the riveted joint of my invention and to furthermore provide an especially designed rivet for this use.

It is an object of my invention to provide a riveted joint in which the rivet has favorable tensile and shear strength and in which the rivet is rigidly secured in place so that it will not loosen or work in its seat and so that the rivet will have optimum resistance to vibratory forces.

A further object of the invention is to produce a flush riveted joint which is fluid-tight under pressure difference conditions.

Entering into the problem of producing the riveted joint of my invention are the method of installing and dimensional factors of the rivet. By making dimensions, head angle, and head volume within a certain prescribed limit, to be hereinafter explained in detail, and by seating the rivet according to a prescribed method, that is, driving the head against the metal to be secured together in such a manner as to form a dimple and to flange the metal being secured together, a riveted joint of the aforesaid character may be produced.

It is an object of my invention to provide a method of riveting to form a riveted joint in which the rivet is of prescribed dimensions and head angle, and in which the rivet is inserted into place by an impact blow or blows, whereafter the extending shank is peened or upset to produce the riveted joint of my invention.

When the type of joint to which my invention appertains is being formed the rivet is caused to form a dimple by flanging the metal sheets. This force employed is, of course, met with resistance by the sheets of metal and produces an extrusion action on the rivet head. This extruding of the head increases the diameter of the head, reduces the head thickness, and increases the angle of the lower surface of the rivet head. This extrusion action produces a volumetric change which may considerably reduce the volume of the head. It also produces a shape change which may so alter the shape of the head that it is unsuited for work which it must perform as a part of the joint. When too great an extrusion action occurs there will be inadequate metal in the head. Furthermore, the metal will be spread outward and the angle of the lower surface increased to such an extent that a feather edge of inferior mechanical strength will be produced. In addition to this, the cold working of the metal impairs the quality of the metal, and the strength factors of the rivet head are harmfully affected.

It is an object of my invention to provide a method of forming a riveted joint in which the volumetric change and shape change are held at a minimum in order to reduce the loss of head volume, loss of head height, loss of head thickness, and increase in head angle of the rivet head.

It is a further object of my invention to provide a method of forming a riveted joint in which the working strains caused by extrusion or shape change are held to a minimum in order to minimize injury to the metal of the head.

It is a still further object of my invention to provide a method of forming a riveted joint in which the head is not materially extruded.

It is another object of my invention to provide a method of forming a riveted joint in which the feathering of the peripheral portion of the head is held to a minimum.

It is a still further object of my invention to provide a method of forming a riveted joint in which there is a strict conformity between the wall forming the dimple which receives the head and the lower surface of the head of the rivet in order to form an adequate bearing surface and in order that there will be no empty space below the rivet head in which corrosion may start.

It is a still further object of my invention to provide a method of forming a riveted joint in which the energy required to form the dimple and seat or set the rivet is of reduced value.

A still further object of my invention is to provide a method of forming a riveted joint in which the strain in the sheets being secured together is reduced to a minimum in order that there will be no buckling of the sheets.

Where the head of the rivet is extruded to a thin edge or featheredge at its periphery, the resistance to cracking is insufficient, and if a cracking of the peripheral portion of the rivet head does not immediately occur it is liable to occur when the rivet is put into use. Furthermore, the thin or featheredge being of relatively low mechanical strength is liable to chip due to prying deformations exerted on the rivet by the buckling of the sheets secured together thereby when the riveted structure is subjected to load.

It is an object of my invention to provide a method of forming a riveted joint in which the periphery of the rivet head is reinforced so as to avoid the cracking and chipping off referred to in the preceding paragraph.

It is a still further object of my invention to provide a method of forming a riveted joint in which during the seating of the rivet head added on metal is forced downwardly into the dimple which receives the rivet head in such a manner as to provide a peripheral flange or reinforcement.

It is also an object of my invention to provide a riveted joint in which the head of the rivet is provided with a peripheral reinforcement or a peripheral flange for the purposes pointed out in the preceding paragraphs.

In developing the method of my invention outlined in the preceding paragraphs and the riveted joint of my invention I have found that superior and improved results may be obtained by the use of a specially designed rivet, and it is an object of my present invention to provide a rivet for use in the method of forming a riveted joint and in the riveted joint of my invention.

It is a further object of my invention to provide a rivet having a head with a conical lower surface and with an added on portion, which added portion is adapted to be forced downwardly during the riveting operation in order to provide the head with a peripheral reinforcement.

I have furthermore discovered that optimum results are obtained where the angle of the rivet head is 100°, but I have furthermore discovered that results may be obtained in accordance with the principle of my invention where the head is at any angle between 95° and 105°. It is accordingly an object of my invention to provide a rivet having a rivet head of conical shape and with an angle of from 95° to 105°.

In addition to the foregoing objects, features, and advantages of my invention, there are other objects and advantages relating from the specific steps or elements of my invention, and these will be pointed out in the course of the following detailed description of my invention.

Referring to the accompanying drawings in which I have illustrated two embodiments of my invention:

Fig. 1 is an elevational view of a preferred embodiment of rivet employed in my invention.

Fig. 2 is a view showing the rivet which has been set in or seated in the metal to be secured together.

Fig. 3 is a sectional view showing the rivet completely riveted in place and the method of my invention completely performed in order to produce the riveted joint of my invention.

Fig. 4 is a diagrammatic view illustrating the first step performed in the method of my invention.

Fig. 5 is a diagrammatic view illustrating the second step performed in the method of my invention.

Fig. 6 is a diagrammatic view illustrating the third step performed in the method of my invention.

Fig. 7 is a view illustrating an alternative form of rivet of my invention.

Fig. 8 is a view illustrating the alternative form of my invention set in or seated.

Fig. 9 is a view showing the alternative form of riveted joint of my invention.

Referring to the drawings in detail, and particularly Figs. 1 to 6 inclusive, the numeral 11 represents a rivet of my invention which has a shank 12, a head 13, and an added on portion 14. This rivet may be made from any ductile material, such, for example, as aluminum alloy, known as A17ST. The shank 12 has a diameter "$d$" of 3.10 mm., and has a length to suit the needs of the particular joint. The head 13 of the rivet has a height of 1.00 mm. and a diameter "$D$" of 5.50 mm. The added on portion 14 is preferably cylindrical and .15 mm. in height. The total height of the head 13 and added on portion 14 is 1.115 mm., and which is referred to by the symbol "$h$."

The angle of the lower conical surface of the head 13 is preferably 100°. However, as will be pointed out in the course of the following description, this angle may be between 95° and 105°. The volume of the head and added on portion is 18.6 cu. mm., and the ratio of the diameter $D$ to the height $h$, in other words, the $D/h$ ratio, is 4.78 which constitutes an index, by comparison of which can be judged the degree of shape change the rivet has suffered in the riveting process, as will be more fully explained in the course of the following description.

It should be understood that the rivet just described is one designed for a particular riveted joint in which the opening formed through the sheets of metal to be riveted is approximately 3.10 mm. I do not wish to be limited to the particular dimensions which have been set forth, but intend to cover all dimensions of rivet which come within the principle of my invention, as will be defined in the following description and appended claims. In addition to the change in diameter which may be made in the shank 12, changes in dimensions of the head 13 may also be made without departing from the invention. For example, if the head angle is increased but the dimension $D$ is maintained the same, the height $h$ will be less. Also, if the dimension $h$ is increased and the dimension $D$ is maintained the same, the angle of the lower surface of the head will be decreased. These and other modifications are possible and may be made within the principle and scope of my invention.

In forming the riveted joint of my invention the first step is to place the rivet in position to be riveted, as illustrated in Fig. 4. Referring to this figure, the numerals 16 and 17 represent sheets of metal in which an opening 18 has been formed, such as by a drilling or punching process.

These sheets of metal may be any ductile material, such, for example, as aluminum alloy, and in the particular joint of my invention illustrated herein the metal is .040 inch in thickness. When the rivet 11 is in place, the shank 12 extends through the opening 18 and the head 13 is in engagement with the upper surface of the sheet 16. Applied against the upper flat surface of the head or the added on portion 14 of the head is a riveting hammer 19. Applied to the opposite side of the sheet of metal 17 is a bucking tool 20 having an annular bucking wall 21 adapted to engage the metal around the opening 18, there being a cavity 22 provided to receive the projecting end of the shank 12.

The next step in the process is the seating of the rivet which is illustrated in Fig. 5. This is accomplished by applying an impact blow through the hammer 19. This impact blow may range between 9 and 13 ft. pounds, and one to two blows are adequate to seat the rivet, as illustrated in Fig. 5. It is quite important to the invention to seat the rivet by an impact blow because this is one of the important contributing factors to the controlling of the volumetric change and shape change of the rivet head, as referred to in the statement of invention, and as will be described in detail in the course of the following description. The impact method referred to herein is to be clearly distinguished from the static pressure method which is conventionally employed for seating a rivet. In the impact method employed in my invention the seating action is very quickly accomplished preferably by one blow, and the results obtained are quite different from those obtainable when a rivet is seated by other methods.

As illustrated best in Fig. 2, the seating of the rivet 11 results in the annular walls of metal constituting those portions of the sheets 16 and 17 surrounding the opening 18 being forced downwardly in order to form flanges 24 and 25. The flanging is well defined and a cavity or dimple is provided for receiving the rivet head 13, which cavity or dimple is provided by an annular conical wall which strictly conforms to the contour of the lower surface of the rivet head 13. It will be seen that there are no spaces between the rivet head and the wall forming the dimple in which corrosion may start. There is, furthermore, a very tight fit between the rivet and the opening and dimple, which is of considerable value in providing a rigid and tight joint capable of withstanding vibrations.

The head 13 furthermore is provided with an upper surface 26 which is substantially flush with the upper surface of the sheet 16. During the seating operation the added on portion 14 is driven or formed downward into the head 13 in order that this flush outer surface 26 may be formed.

In this form of my invention one of the advantageous results which is accomplished is the formation of the peripheral reinforcement 28 which in shape is somewhat of an annular bead formed at the outer edge of the lower surface of the rivet head. This bead is formed at the lower surface and produces an annular depression 29 at the extreme outer part of the dimple which receives this reinforcement.

At the completion of this operation just described the shank diameter $d$ is unchanged. The head diameter $D$, however, has increased to 6.00 mm. The head height $h$ has decreased to 1.00 mm. The head angle, that is, the angle of the lower surface of the rivet head, has increased to 110.8°. The volume of the head has decreased to 16.89 cu. mm. The $D/h$ ratio has increased to 6.00.

The next step in the process is the upsetting of the extended end of the shank 12 which is illustrated in Fig. 6. This is accomplished by any well known method and is performed while the hammer 19 is held against the head of the rivet to act as a bucking tool. The numeral 31 is representative of any desired type of riveting hammer which is applied against the end of the shank in order to form the upset portion 32.

As shown in Fig. 3, additional dimensional changes occur during the final step of upsetting and the riveted joint when completed has the dimensions illustrated in Fig. 3. The shank diameter $d$ is increased to 3.15 mm. which is effective in obtaining a very tight and rigid joint. The head diameter $D$ has not increased over the diameter $d$ illustrated in Fig. 2. The height $h$ in the head has been decreased to .95 mm. and the peripheral flange 28 is very slightly increased in size. The angle of the lower surface of the head has increased to 112.6°. The volume of the head has decreased to 15.76 cu. mm. and the $D/h$ ratio has increased to 6.32. Comparing the dimensions and shape of the rivet as shown in Fig. 3 with the dimensions and shape of the rivet shown in Fig. 1, it is found that certain changes have taken place. These changes, however, have been held within desired limits in order to achieve certain important results and to obtain the desired riveted joint. The first change to be noted is the increase of the head angle of 100° to 112.6°. This increase in angle, however, when compared to the head height $h$ does not produce a featheredge which will crack or chip off. This is particularly the case in view of the forming of the peripheral reinforcement 28.

It will furthermore be noted that there has been a volumetric change in the rivet head, and that the volume of metal has decreased from 18.46 cu. mm. to 15.76 cu. mm., which is an indication of the amount of extrusion which the rivet has undergone. The volume of the rivet head has decreased 2.70 cu. mm. or 14.5%, which is a relatively small depreciation in volume as compared to prior art methods.

In addition to this, there has also been an increase in the ratio of the diameter of the rivet head to the height of the rivet head, that is to say, the $D/h$ ratio. This increase in $D/h$ ratio indicates the shape change which the rivet has undergone. There has been an increase from 4.78 to 6.32 which is 1.54 or 32.2%. Both of these values, that is to say, the percentage of volume change and the percentage of shape change, clearly indicate that the working of the metal of the rivet head has been held to a practical minimum, and that the metal has not therefore been subjected to strains and stresses which impair its strength and which render it unsuited for service.

In the preferred form of my invention the angle of the rivet head is 100°. However, the results of my invention may be achieved with a range of from 95° to 105°. Therefore, although I prefer to use the 100° head, I do not wish my invention to be limited to this particular angle. As the angle of the head is decreased below 100° the projected area of the head, that is, the difference in diameter between the shank and the head, diminishes as the head angle diminishes. This in effect increases the driving stress, and the metal of the rivet head is, with this decrease in angularity, subjected to greater loads, and, upon too great a decrease in this angle, is overloaded with the result that excessive extruding action occurs which produces a rivet head which has a very small height in spite of the greater thickness of the original head, and has a feather edge possessing the disadvantages referred to heretofore. The crystalline structure of the metal is considerably damaged by reason of this excessive working, and therefore the joint produced will be inferior to that of my invention. I have therefore determined the minimum angle to be employed in my invention to be 95°.

When the angle is increased above 100°, similar unsatisfactory actions occur. As the angle is increased the head becomes thinner and the initial shape before riveting action starts becomes less satisfactory. When seating such a rivet, due to the original shape of the head, extrusion will occur, and the result will be similar to that pointed out where the head angle is reduced. I have determined that the greatest head angle to be used in the principle of my invention is 105°.

The added on portion of my invention serves an important function in the preferred form of my invention and not only forms the peripheral flange or reinforcement 28, but also adds to the volume of the head to compensate for loss of volume and loss of height due to extrusion. The shape of the added on portion need not be cylindrical, but I have chosen a cylindrical head because of the ease in handling.

In the form of my invention illustrated in Figs. 7 to 9 inclusive I employ a rivet 40, as shown in Fig. 7, which does not have an added on portion. This rivet has the shank 12 and head 13. The diameters of the shank 12 and head 13 are the same as in Fig. 1, and the angle of the lower surface of the head is also 100°. In this form of my invention, however, the height of the head $h$ is 1.05 mm. The volume of the head is 15.64 cu. mm. and the $D/h$ ratio is 5.24. When the rivet is set as shown in Fig. 8 the flanging of the sheets 16 and 17 is accomplished in exactly the same manner as described with respect to the first form of my invention, and apparatus identical to that used is employed. The dimensional changes which occur are as follows. The diameter $d$ of the shank 12 is the same. The head diameter D has increased to 5.80 mm. The head height $h$ has decreased to .89 mm. and the head angle has increased to 115°. The volume of the head has decreased to 14.2 cu. mm. and the $D/h$ ratio has increased to 6.52. After the rivet has been seated as shown in Fig. 8, the upsetting of the projecting end of the shank is then accomplished as explained in connection with Fig. 6 when the first form of my invention was described.

As shown in Fig. 9, the final shape of the rivet is illustrated. The shank diameter has remained unchanged. The head diameter D has increased to 5.90 mm., the head height $h$ has decreased to .85 mm., and the head angle has increased to 117.5°. The volume of the head has decreased to 13.91 cu. mm., and the $D/h$ ratio has increased to 6.94.

The decrease in head volume is 1.73 cu. mm. or 14.0% and the increase in shape index or $D/h$ ratio is 1.70 or 32.5%. These percentages are comparable to those obtained in the preferred form of my invention which is illustrated in Figs. 1 to 6 inclusive.

In the form of my invention just described due to the absence of the added on portion there is no peripheral flange, and furthermore the resulting head height $h$ is about .10 mm. less than that of the preferred form of my invention as illustrated in Fig. 3. In this latter form of my invention the head angle may vary between 95° to 105° and other dimensional changes may be made, as has been thoroughly discussed heretofore.

I believe my invention to be broadly new not only with respect to a method of forming a riveted joint, but also in the riveted joint which is produced and also in the form of rivet which I employ. It is believed from the foregoing description those skilled in the art will readily appreciate the important advance of my invention over the prior art and the valuable advantages and new results which have been achieved. I recognize that various alterations and modifications may be made without departing from the spirit and scope of my invention, and I therefore intend that my invention shall be construed in accordance with the principle herein disclosed as defined in the accompanying claims.

I claim as my invention:

1. A method of riveting a plurality of members, which method includes: forming an opening through said members; inserting through said opening a rivet having a conical head merging into its shank, said head having an added on portion; applying an impact force to said head to cause a dimple to be formed by said head for receiving said head and to deform said added on portion to provide said head with a peripheral reinforcement; and upsetting the shank of said rivet, thus securing said members together.

2. A method of riveting a plurality of members, which method includes: forming an opening through said members; inserting through said opening a rivet having a conical head with an angle between 95° and 105° and added on portion; applying an impact force to said head to cause a dimple to be formed by said head for receiving said head and to deform said added on portion to provide said head with a peripheral reinforcement; and upsetting the shank of said rivet, thus securing said members together.

3. A method of riveting a plurality of members, which method includes: forming an opening through said members; inserting through said opening a rivet having a conical head with an angle between 95° and 105° merging into its shank; applying to said head an impact blow sufficient to cause said head to form a dimple to receive said head and to increase the original angle of said head not more than 18°; and upsetting the shank of said rivet, thus securing said members together.

4. A method of riveting a plurality of members, which method includes: forming an opening through said members; inserting through said opening a rivet having a conical head with an angle of between 95° and 105° merging into its shank; applying to said head an impact blow sufficient to cause said head to form a dimple to receive said head and to deform said head to an angle of about 110° with the top surface of said head substantially flush with one of said members; and upsetting the shank of said rivet and increasing said head angle to about 113°, thus securing said members together.

5. A method of riveting a plurality of members, which method includes: forming an opening through said members; inserting through said opening a rivet having a conical head and added on portion, said head merging into its shank; applying an impact force to said head to cause a dimple to be formed by said head for receiving said head and to deform said added on portion into said head to compensate for loss in head height due to extrusion; and thereafter upsetting the shank of said rivet, thus securing said members together.

6. A method of riveting a plurality of members, which method includes: forming an opening through said members; inserting through said opening a rivet having a conical head with an angle between 95° and 105° merging into its shank, said head having an added on portion; applying an impact force to said head to cause a dimple to be formed by said head for receiving said head and to deform said added on portion into said head to compensate for loss in head height due to extrusion; and upsetting the shank of said rivet, thus securing said members together.

7. A method of riveting a plurality of members, which method includes: forming an opening through said members; inserting through said opening a rivet having a conical head with an angle between 95° and 105° merging into its shank, said head having an added on portion; applying to said head an impact blow sufficient to cause said head to form a dimple to receive said head and to form said head with an outer surface substantially flush with one of said members while maintaining the change in the D/h ratio of said head to not more than 33%; and upsetting the shank of said rivet, thus securing said members together.

8. A method of riveting a plurality of members, which method includes: forming an opening through said members; inserting through said opening a rivet having a conical head with an angle between 95° and 105° merging into its shank, said head having an added on portion; applying to said head an impact blow sufficient to cause said head to form a dimple to receive said head and to form said head with an outer surface substantially flush with one of said members while maintaining the change in the head volume to not more than 15%; and upsetting the shank of said rivet, thus securing said members together.

9. A method of riveting a plurality of members, which method includes: forming an opening through said members; inserting through said opening a rivet having a conical head of an angle of approximately 100° merging into its shank, said head having an added on portion; applying an impact force to said head to cause a depression to be formed by said head in at least one of said members for receiving said head and to deform said added on portion to provide said head with a peripheral reinforcement; and upsetting the shank of said rivet to secure said members together.

10. A method of riveting a plurality of members, which method includes: forming an opening through said members; inserting through said opening a rivet having a conical head of an angle of approximately 100° merging into its shank; applying to said head an impact blow sufficient to cause said head to form a depression in at least one of said members to receive said head and to increase the original angle of said head not more than 18°; and upsetting the shank of said rivet to secure said members together.

11. A method of riveting a plurality of members, which method includes: forming an opening through said members; inserting through said opening a rivet having a conical head merging into the shank of the rivet and having an added on portion; driving by impact force said head and said members relatively toward each other to cause a dimple to be formed by said head for receiving said head and to deform said added on portion into said head to compensate for loss in head height due to extrusion; and upsetting the shank of said rivet, thus securing said members together.

12. A method of riveting a plurality of overlapping members, which method includes: forming an opening through said members; inserting through said opening the shank of a rivet having a head having an added on portion and having a lower conical wall; driving by impact force the head of said rivet relatively toward said members and into a position in which the upper wall of said rivet is substantially flush with the surface of the upper member and deforming said added on portion into the conical portion of the head and causing said head to deform the portion of said members surrounding said opening into conical flanges which converge downwardly and to thereby form a dimple for receiving said head; and upsetting the shank of said rivet, thus securing said members together.

13. A method of riveting a plurality of overlapping members, which method includes: forming an opening through said members; inserting through said opening the shank of a rivet having a head with a lower conical wall which merges into its shank; driving by impact force the head of said rivet relatively toward said members and into a position in which the upper wall of said rivet is substantially flush with the surface of the upper member and thereby causing said head to deform the portion of said members surrounding said opening into conical flanges which converge downwardly and to thereby form a dimple for receiving said head; and upsetting the shank of said rivet, thus securing said members together.

VLADIMIR H. PAVLECKA.

CERTIFICATE OF CORRECTION.

Patent No. 2,233,820. March 4, 1941.

VLADIMIR H. PAVLECKA.

It is hereby certified that error appears in the printed specification of the above numbered patent requiring correction as follows: Page 1, first column, line 38, for "farces" read --forces--; page 4, first column, line 60, for "Ase" read --As--; line 69, for "14.0%" read --11.0%--; and that the said Letters Patent should be read with this correction therein that the same may conform to the record of the case in the Patent Office.

Signed and sealed this 29th day of April, A. D. 1941.

(Seal)

Henry Van Arsdale,
Acting Commissioner of Patents.